United States Patent [19]

Turner et al.

[11] Patent Number: 5,106,668
[45] Date of Patent: Apr. 21, 1992

[54] MULTI-LAYER HONEYCOMB STRUCTURE

[75] Inventors: Peter Turner, Oakley; John L. Corden, Dublin, both of Calif.

[73] Assignee: Hexcel Corporation, Dublin, Calif.

[21] Appl. No.: 363,255

[22] Filed: Jun. 7, 1989

[51] Int. Cl.⁵ .................................... B32B 3/12
[52] U.S. Cl. ............................ 428/116; 52/806; 428/118
[58] Field of Search ............ 428/73, 116, 117, 118; 52/806

[56] References Cited

U.S. PATENT DOCUMENTS

| | | | |
|---|---|---|---|
| 2,720,949 | 10/1955 | Pajak | 428/118 |
| 3,257,260 | 6/1966 | Morgan | 428/118 |
| 3,376,684 | 4/1968 | Cole et al. | 52/635 |
| 3,481,427 | 12/1969 | Dobbs et al. | 428/118 X |
| 3,600,257 | 8/1971 | Reinhardt | 428/118 |
| 3,670,843 | 6/1972 | Kelly et al. | 428/116 X |
| 3,673,057 | 6/1972 | Fairbanks | 428/116 |
| 3,948,346 | 4/1976 | Schindler | 428/118 X |
| 4,084,367 | 4/1978 | Saylor et al. | 428/116 X |
| 4,235,303 | 11/1980 | Dhoore et al. | 428/116 X |
| 4,265,955 | 5/1981 | Harp et al. | 428/116 |
| 4,271,219 | 6/1981 | Brown | 428/116 |
| 4,294,329 | 10/1981 | Rose et al. | 428/116 X |
| 4,336,292 | 6/1982 | Blair | 428/116 |
| 4,370,372 | 1/1983 | Higgins et al. | 428/116 |
| 4,404,889 | 9/1983 | Miguel | 428/118 X |
| 4,421,201 | 12/1983 | Nelsen et al. | 428/116 X |
| 4,465,725 | 8/1984 | Riel | 428/116 |
| 4,641,726 | 2/1987 | Fearon et al. | 428/116 X |
| 4,687,691 | 8/1987 | Kay | 428/73 |
| 4,743,740 | 5/1988 | Adee | 428/116 X |
| 4,803,108 | 2/1989 | Leuchten et al. | 428/118 |
| 4,807,411 | 2/1989 | Capaul | 428/116 X |

Primary Examiner—Henry F. Epstein
Attorney, Agent, or Firm—Townsend and Townsend

[57] ABSTRACT

A multi-layered structural panel having a high-density cellular core adjacent and parallel to a low-density cellular core is disclosed. Preferably, the first core has a density at least 10% greater than the second core. The first panel preferably accounts for 10% to 25% of the structural material thickness.

26 Claims, 2 Drawing Sheets

MULTI-LAYER HONEYCOMB STRUCTURE

FIELD OF THE INVENTION

The present invention relates to a cellular structural material and, in particular, to a structural material having a high-density honeycomb core adjacent a low-density honeycomb core.

BACKGROUND OF THE INVENTION

Honeycomb panels have been known in a structural material for providing good strength qualities with low mass density. A typical honeycomb structure includes a hexagonally cellular core with a skin layer covering at least one face of the core. The skin is useful, for example, for improving strength and for preventing water ingression.

In some applications, such as for flooring, a honeycomb panel can be expected to receive stress from compressive bending, dropping of objects, and the like. Decking on mobile or fixed bridges is an application which typically involves impact loading plus high bending loads. Applications such as aircraft flooring panels must be extremely lightweight, such as 1 lb./ft.$^2$ (about 5 kg/m$^2$), yet must tolerate drop impacts. Leading edges of airfoils and other exposed sections of a rapidly moving structure can experience high-impact loads upon collision with small objects.

In a traditional honeycomb configuration, resistance to impact or bending stress damage is achieved by increasing the thickness of the outer skin, increasing the density of the honeycomb, or adding a stringer or hat section to reinforce the outer skin. Water ingression has traditionally been prevented by foam-filling the cells. Each of these methods, however, causes an increase in the mass density of the resulting structure. Accordingly, it would be useful to provide a honeycomb panel which has good strength, particularly for resistance to compressive bending stresses, high resistance to damage from drop and other impacts, and resistance to water ingression while maintaining a low mass density.

SUMMARY OF THE INVENTION

It has been found that the weight increases attendant to measures used in past structures to provide bending and impact-resistant structures are not necessary to achieve those goals. The structural material of the present invention includes a dual honeycomb structure with a high-density first honeycomb core attached to a second, lower-density honeycomb core. The density of the second honeycomb core is at least about 10%, preferably at least about 25%, and most preferably, at least about 50% less than the density of the first honeycomb core. Preferably, the high-density honeycomb which receives the impact or compressive bending stress is between about 10% and about 25% of the overall thickness of the structure. The low-density honeycomb core is preferably between about 75% and about 90% of the overall thickness of the structure. The second honeycomb core is of relatively low density, and acts to carry the shear stress even though it is not, by itself, able to withstand the impact or bending stresses which can be supported by the laminated structure. Preferably, the two honeycomb cores share a common septum or interior structural skin.

DETAILED DESCRIPTION OF THE PREFERRED EMBODIMENT

Figure 1:
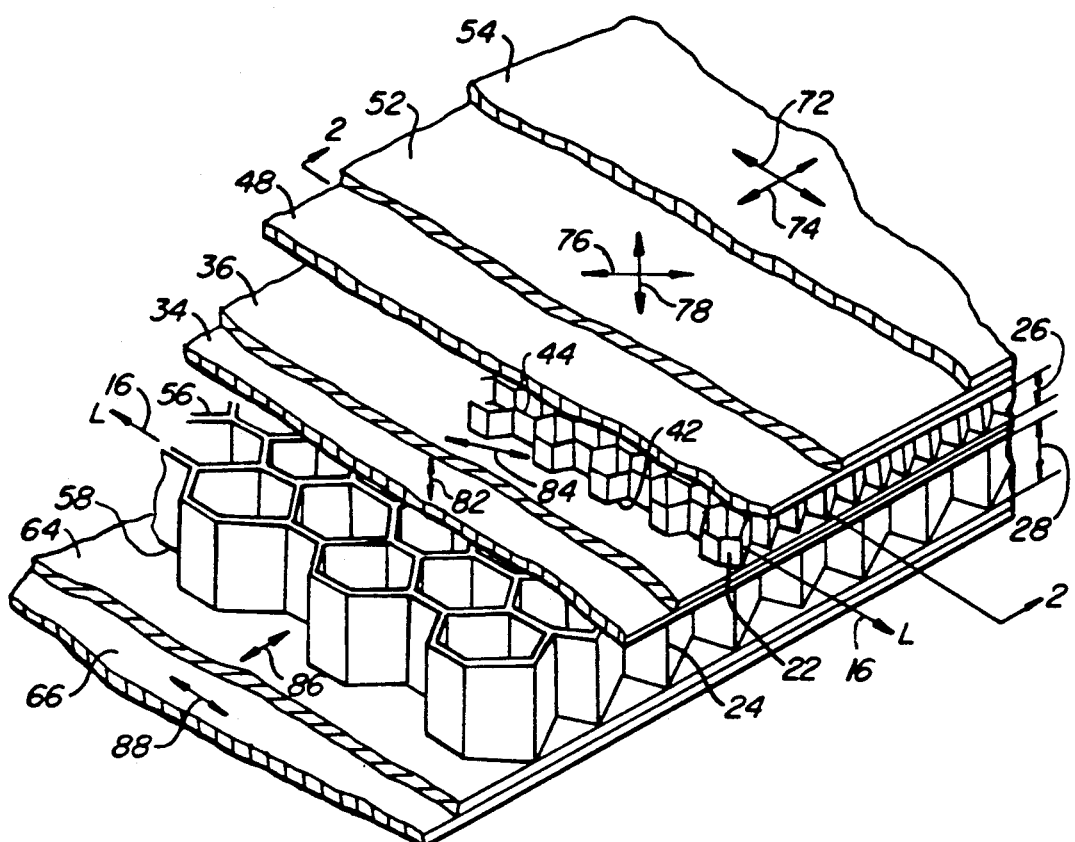
FIG. 1 is a partial perspective view of a structural material according to the present invention, with portions cut away to show the interior structure.

The present invention includes a first higher-density cellular core attached to a second, lower-density cellular core. Preferably, each cellular core is a honeycomb or hexagonal structure which includes a multiplicity of hexagonal cells defined by walls which are adjacent or, preferably, in common among the cells, as seen in FIG. 1. In the preferred embodiment, the walls of the cells are in planes which are transverse to the faces of the cellular cores.

Figure 3:
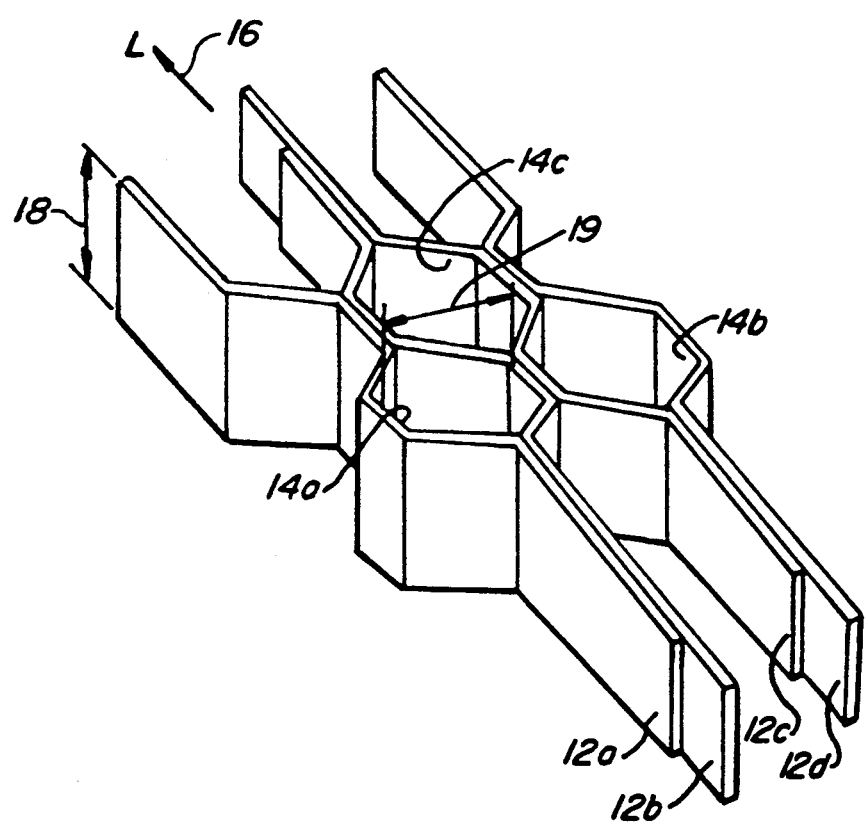
FIG. 3 is a perspective view of a manner of forming ribbons into a honeycomb.

To aid in the following discussion of the structural panel, it is useful to briefly describe one common method of forming a honeycomb core from ribbon material. Referring to FIG. 3, according to a well known honeycomb-forming process, a plurality of ribbons 12a, 12b, 12c, 12d are joined with each other, as depicted in FIG. 3, to form the walls of a plurality of hexagonal cells 14a, 14b, 14c. For purposes of the following discussion, a honeycomb core formed in this way has a ribbon direction, as indicated by the arrow 16 in FIG. 3, defined by the direction in which the ribbons 12a, 12b, 12c, 12d longitudinally extend. This direction is commonly known as the "L" direction. A core formed in this manner will have a core thickness 18. Each cell 14a, 14b, 14c will have a size defined by the diametrical flat-to-flat distance 19. Each cell 14a, 14b, 14c will have an interior volume so that the core, as a whole, will have an average cell volume. Similarly, walls of each cell wall have a wall thickness defined by the transverse thickness of the ribbons 12a, 12b, 12c, 12d, so that the core, as a whole, will have an average cell wall thickness.

Referring to FIG. 1, the preferred embodiment of the present invention includes a first honeycomb core 22 and a second honeycomb core 24. The first core 22 has a first thickness 26, and the second core 24 has a second thickness 28. The first honeycomb core 22 can be formed using a variety of materials for the cell walls. Preferably, the wall material is metallic, most preferably including aluminum. In one embodiment, the wall material is an alloy containing about 97% aluminum, such as the alloy known in the aluminum industry as "5052." In one preferred embodiment, the first honeycomb core 22 has a cell size of about ⅛ inch (about 3 mm), and a thickness 26 of about 0.188 inches (about 4.78 mm). The mass density of a honeycomb core will be determined by a number of factors, including the density of the wall material, the wall thickness, and the cell size or volume. The mass density of the first honeycomb core is preferably between about 5 lb./ft.$^3$ (about 80 kg/m$^3$) and about 55 lb./ft.$^3$ (about 880 kg/m$^3$), preferably between about 7 lb./ft.$^3$ (about 110 kg/m$^3$) and about 15 lb./ft.$^3$ (about 240 kg/m$^3$). Most preferably, the first honeycomb core 22 has a mass density of about 8.1 lbs./ft.$^2$ (about 130 kg/m$^3$). Typically higher-density cores in the range of about 12 lb./ft.$^3$ (about 190 kg/m$^3$) and about 55 lb./ft.$^3$ (about 880 kg/m$^3$) are used where energy absorption is desired.

The walls of the second honeycomb core 24 can be made of a variety of materials. In one preferred embodiment, the walls of the second core 24 are made of a paper composed of a thermoplastic fiber, such as an aramid fiber, sold by E. I. duPont de Nemours & Co., Wilmington, Del., under the trade name "NOMEX TM." In one preferred embodiment, the second honeycomb core 24 has a cell size of about ⅛ inch (about 3 mm), and a thickness of 0.750 inches (about 20 mm). The mass density of the second honeycomb is preferably between about 1 lb./ft.$^3$ (about 15 kg/m$^3$) and about 12 lb./ft.$^3$ (about 190 kg/m$^3$), more preferably between about 2 lb./ft.$^3$ (about 30 kg/m$^3$) and about 5 lb./ft.$^3$ (about 80 kg/m$^3$), and most preferably is about 3 lbs./ft.$^3$ (about 50 kg/m$^3$).

Figure 2:
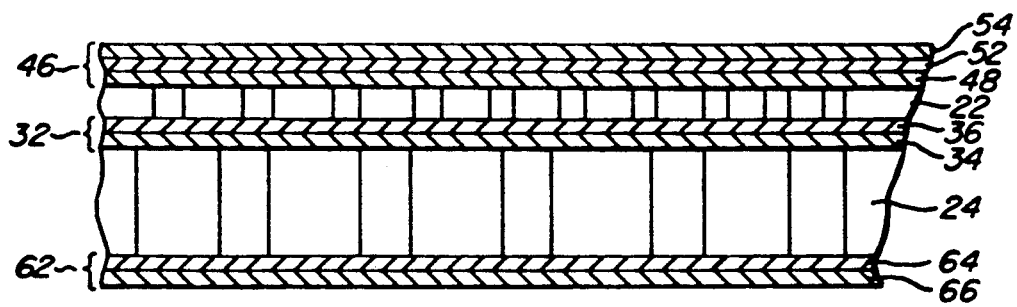
FIG. 2 is a cross-sectional view taken along line 2—2 of FIG. 1.

The first core 22 is attached, directly or indirectly, to the second core 24 in a parallel orientation, i.e., with a face of the first core 22 parallel to a face of the second core 24. The distance between the first honeycomb core and the second honeycomb core 24 is less than the thickness 28 of the second core and, preferably, is about 0.001 inches (about 0.25 mm). Although the first and second cores 22, 24 could be directly attached to each other, such as by an adhesive or, in the case of appropriate honeycomb materials, welding, brazing, or the like, it is preferred to attach the second core 24 to the first core 22 using a common septum 32 (FIG. 2). Preferably, the septum 32 includes at least one layer of a fiber-reinforced material. In one preferred embodiment, the septum 32 includes a first layer of fiber-reinforced epoxy 34 and a second layer of fiber-reinforced epoxy 36, each preferably with a thickness of about 10 mils (about 0.25 mm). In this embodiment, the fibers in each of the layers 34, 36 are glass fibers, such as those sold by Owens-Corning Fiberglass Corp. of Toledo, Ohio, under the designation "S2 TM." A number of epoxies can be used, including amine-curing epoxies and anhydride-curing epoxies. An example of such epoxies is that sold by Hexcel Corp., Dublin, Calif., under the trade name "F533 TM".

Preferably, the fibers in each layer 34, 36 are preferentially oriented and disposed in a manner more thoroughly described below. The proportion of fibers to resin in the layers 34, 36 is such as to provide approximately 50% dry resin content (DRC) in the prepreg (i.e., reinforcing material combined with a full complement of resin, before forming). By "dry" resin content is meant the content not including solvents. Such a fiber-reinforced layer is sold by Hexcel Corp., Dublin Calif., under the designation "T2S-254-F533 TM." Although the layers 34, 36 can be attached to each other and to the honeycomb cores 22, 24 using a separate adhesive, preferably, the epoxy resin of the layers 34, 36 has sufficient adhesive qualities to achieve the necessary adhesion without additional materials. The septum 32 acts to join the cores 22, 24 in a fashion to transmit shear and bending moments.

Referring again to FIG. 1, it can be seen that the first honeycomb core 22 has two faces. One face 42 is attached, directly or indirectly, to the second core 24. The second face 44 is preferably covered by a sheet-like skin 46 (FIG. 2). In the preferred embodiment, the skin 46 includes three layers. A first layer of adhesive 48 immediately contacts the upper face 44 of the first honeycomb core 22. First and second fiber-reinforced skin layers 52, 54 are provided overlying the adhesive 48, each with a thickness of about 6 mils (about 0.15 mm). The adhesive 48 is preferably an epoxy film adhesive, such as that sold by 3M Company, St. Paul, Minn., under the designation "AF-126 TM." In the preferred embodiment, the adhesive is applied with an areal weight of about 0.05 lbs./ft.$^2$ (about 0.25 kg/m$^2$).

Preferably, each of the fiber-reinforced layers 52, 54 is an epoxy resin layer reinforced with a high tensile strength fiber, such as an aromatic polyamide fiber, including the fiber sold by E. I. duPont de Nemours & Co., Wilmington, Del., under the designation "KEVLAR TM." The layer is preferably 50% DRC. In the preferred embodiment, the reinforcing fibers are provided in the form of a harness-woven fabric having a majority of warp fibers on one face and a majority of fill fibers on the other face. Preferably, on the outer-most layer 54, the face having the majority of warp fiber is the exterior face. The reinforced layers 52, 54 have a fiber orientation defined by the direction of the warp fibers, preferably disposed as described more fully below. Such a fiber-reinforced layer is sold by Hexcel Corp., Dublin, Calif., under the designation "K49-285-F155 TM."

As depicted in FIG. 1, the second honeycomb core 24 has a first face 56 which is in contact with the septum 32, and a second face 58. A sheet-like skin 62 (FIG. 2) preferably covers the second face 58 of the second honeycomb core 24. In a preferred embodiment, the bottom skin 62 includes first and second layers 64, 66 of fiber-reinforced material, each with a thickness of about 6 mils (about 0.15 mm). Preferably, the first layer 64 is substantially of the same material as the layers of septum material 34, 36. The bottom-most layer 66 is preferably identical in composition to the penultimate layer 64, except that the outer-most layer 66 has a 27% DRC. Material of this type is sold by Hexcel, Corp., Dubin, Calif., under the designation "T2S-244-F523 TM."

In the preferred embodiment, at least some of the layers of the structural material have defined orientations which are disposed in a preferred manner. To describe the disposition of these oriented layers, at least one layer must be taken as defining a reference direction. For purposes of the present discussion, the top-most layer 54 will be used to define a reference direction. The reference direction will be defined by the direction of the warp fibers in the outer-most layer 54. In the preferred embodiment, the warp fibers are disposed in one of the two directions indicated by the two double-headed arrows 72, 74 of FIG. 1. The preferred orientation for the next layer 52 is one of the directions indicated by the double-headed arrows 76, 78 in FIG. 1, i.e., with an orientation at approximately 45° with respect to the reference direction 72 or 74.

The adhesive layer 48 is substantially unoriented. The first honeycomb core 22 is oriented such that the L direction 16 is substantially parallel to the direction indicated by the first double-headed arrow 72 of the upper-most layer 54. The first and second septum layers 34, 36 are oriented with the fiber orientation at approximately 45° to the reference direction 72 or 74. The orientations of the two septum layers 34, 36 are preferably orthogonal with respect to each other. One such fiber orientation is depicted by the double-headed arrows 82, 84 in FIG. 1. The L direction of the second honeycomb core 24 is preferably substantially parallel to the L direction of the first honeycomb core 22. The bottom two layers 64, 66 preferably have orientations which are orthogonal to each other and are, respectively, parallel to and orthogonal to the reference direction 72 or 74. One such orientation is depicted by the double-headed arrows 86, 88 in FIG. 1.

In a preferred embodiment, the core has a thickness of about 1 inch (about 25 mm) and is of such a density that a square-foot of paneling weighs approximately 0.885 pounds (i.e., a square-meter weighs approximately 0.033 kg). Preferably, the edges of the panel are covered according to any compatable standard edge-covering techniques and materials known in the honeycomb panel industry. The panel of the present invention can be attached to other structures to form flooring, walls, air-foils, or other members, by conventional attachment methods, such as bolting, riveting, screwing, adhesion, welding, brasing, and the like.

According to one method of construction, the various cores and layers for the finished panel are initially laid-up. The laid-up cores and layers are preferably co-cured, such as by heating to about 250° F. (about 400° K.), and held at that temperature for about 60 to 90 minutes. The curing is preferably conducted under a pressure of 30 to 80 lbs./in.$^2$ (about 200 to 550 kPa), for example in an autoclave or a heated parallel platen press.

In light of the above description, a number of advantages of the present invention can be recognized. The present invention provides for a multi-layered structural panel which is lightweight. The structural panel is resistant to impact, particularly to impact from the direction closest to the high-density honeycomb core 22. The present invention provides for producing a structure which is hardened to reduce or resist damage from flying objects, from drop-impacts, and from bending stress, without a substantial weight penalty. The present invention resists water ingression without the necessity for placing materials, such as foam, in the cell spaces. The present invention is resistant to outer-skin wrinkling. The present invention provides for absorption of shear stress by the low-density core and absorption of impact or compressive bending stresses by the high-density core.

A number of variations and modifications of the described invention can also be used. Honeycomb core walls can be made of materials other than aluminum or fiber paper, including plastic, organic fiber, and ceramic. The dual-honeycomb material can be provided without the described septum and/or skins. The reinforcing fibers can be of a composition other than those described, including graphite, ceramic, or organic fibers. Orientations of layers other than those described can be provided for particular uses. Additional layers of honeycomb core, skin, septa, or other additional layers can be attached for particular purposes.

Although the description of the present invention has included a preferred embodiment and certain variations thereon, other variations and modifications will be apparent to those skilled in the art, the scope of the invention being stated in the following claims.

What is claimed is:

1. A multi-layer structure, comprising:
   a first honeycomb core structural layer having a multiplicity of cells, said first core having a first mass density and a first thickness, said first core defining a first face and a second opposite face; and
   a second honeycomb core structural layer having a multiplicity of cells, said second core having a second mass density and a second thickness, said second mass density being at least about 10% less than said first mass density, said second core defining a third face and a fourth, opposite face;
   means for affixing said third face of said second core with respect to said second face to prevent relative movement of said first and second cores, said third face positioned, at a distance from said second face which is less than said second thickness to provide a laminated structure having a third thickness;
   an upper skin made of a non-perforate sheet-like material affixed to and substantially parallel to said first face of said first core;
   a lower skin made of a non-perforate sheet-like material affixed to and substantially parallel to said fourth face of said second core;
   said upper skin and said lower skin being substantially free from extension into said cells of said first and second cores.

2. A multi-layer structure, as claimed in claim 1, wherein said second mass density is at least about 50% less than said first mass density.

3. A multi-layer structure, as claimed in claim 1, wherein said first thickness is less than said second thickness.

4. A multi-layer structure, as claimed in claim 1, wherein said first thickness is between about 10% and about 25% of said third thickness.

5. A multi-layer structure, as claimed in claim 1, wherein said second thickness is between about 75% and about 90% of said third thickness.

6. A multi-layer structure, as claimed in claim 1, wherein said first core is substantially metallic.

7. A multi-layer structure, as claimed in claim 1, wherein said first core is substantially aluminum.

8. A multi-layer structure, as claimed in claim 1, wherein said second core is substantially a thermoplastic fiber paper.

9. A multi-layer structure, as claimed in claim 1, wherein said means for affixing includes a septum affixing said second core to said first core.

10. A multi-layer structure, as claimed in claim 9, wherein said septum includes at least a first sheet of fiber-reinforced resin.

11. A multi-layer structure, as claimed in claim 1, wherein said upper skin includes a fiber-reinforced resin layer.

12. A multi-layer structure, as claimed in claim 1, wherein said lower skin includes a fiber-reinforced resin layer.

13. A multi-layer structural material comprising:
   a first sheet, including a layer of fiber-reinforced resin said first sheet made of a non-perforate sheet-like material;
   a first core structural layer having a first face affixed to and substantially parallel to said first sheet, and a second face, said first core comprising a multiplicity of cells with walls of a first wall material disposed substantially transversely to the first face, said first core having a first thickness and a first mass density;
   a second core structural layer having a third face and a fourth face, said second core comprising a multiplicity of cells with walls of a second wall material disposed substantially transversely to said third face, said second core having a second thickness and a second mass density less than said first mass density;
   means for affixing said second core with respect to said first core to prevent relative movement of said first and second cores, said means for affixing including a second sheet, having a layer of fiber-reinforced resin, said second sheet affixed to said second face of said first core and said third face of said second core;

a third sheet, including a layer of fiber-reinforced resin, affixed to and substantially parallel to said fourth face of said second core to provide a structural material having a third thickness said third sheet made of a non-perforate sheet-like material; and said first sheet and said second sheet being substantially free from extension into said cells of said first and second cores.

14. A structural material, as claimed in claim 13, wherein said first thickness is less than said second thickness.

15. A structural material, as claimed in claim 13, wherein said first thickness is between about 10% and about 25% of said third thickness.

16. A structural material, as claimed in claim 13, wherein said second thickness is between about 75% and about 90% of said third thickness.

17. A structural material, as claimed in claim 13, wherein said first sheet includes at least one layer of epoxy resin reinforced with an aromatic polyamide fiber.

18. A structural material, as claimed in claim 13, wherein at least one of said second and said third sheets includes at least one layer of epoxy resin reinforced with glass fiber.

19. A structural material, as claimed in claim 13, wherein said first core includes hexagonal cells defined by aluminum walls.

20. A structural material, as claimed in claim 13, wherein said first density is at least 50% greater than said second density.

21. A structural material, as claimed in claim 13, wherein said first density is between about 5 lb./ft.$^3$ and about 55 lb./ft.$^3$.

22. A structural material, as claimed in claim 13, wherein said first density is about 8 lbs./ft.$^3$.

23. A structural material, as claimed in claim 13, wherein said second core includes hexagonal cells defined by thermoplastic fiber paper walls.

24. A structural material, as claimed in claim 13, wherein said second density is between about 1 lb./ft$^3$ and about 12 lb./ft.$^3$.

25. A structural material, as claimed in claim 13, wherein said second density is about 3 lbs./ft.$^3$.

26. A structural material, as claimed in claim 13, wherein said means for affixing includes a nonperforate sheet-like material to resist water ingression.

* * * * *